Oct. 17, 1961 C. B. WILKINS 3,005,106

DATA SENSING APPARATUS

Filed Oct. 14, 1959

INVENTOR
COLIN BERNARD WILKINS

BY Haseltine and Nydick

ATTORNEYS

United States Patent Office 3,005,106
Patented Oct. 17, 1961

3,005,106
DATA SENSING APPARATUS

Colin Bernard Wilkins, Blackmore End, Wheathampstead, England, assignor to International Computers and Tabulators Limited Filed Oct. 14, 1959, Ser. No. 846,459
Claims priority, application Great Britain Nov. 26, 1958
6 Claims. (Cl. 250—208)

This invention relates to apparatus for sensing recorded data.

Data for machine processing has been recorded by perforations in cards and tapes for many years. Such cards and tapes are manufactured with considerable accuracy and the perforating machines are designed to position the perforations accurately. The recorded data may be sensed subsequently for machine processing by tabulators, computers, etc., by relatively simple arrangements because of this accuracy in original preparation.

Proposals have been made for recording data directly on a source document, such as a bank cheque, or a sales invoice, to make this document itself suitable for machine processing. This avoids the necessity for transcribing the data from the source document on to cards or tape. The data may be recorded by printing a pattern of code marks on the document, the marks being sensed optically or magnetically, for example. Recording and sensing arrangements suitable for use with source document processing are described in British Patents 793,102 and 793,103.

Sensing of data recorded on source documents is generally more difficult than for conventional punched cards or tapes because of the difficulty of ensuring that the recorded data is accurately positioned in relation to the sensing device. The lack of accuracy may arise from one or more of several causes. The document is generally manufactured with less accuracy than a punched card, is often made of a relatively flimsy paper, and it may be subject to wear and damage before being processed. All these factors reduce the accuracy with which the document may be presented to the sensing device. There may be many points of origination of the source documents, with a consequent requirement that the device for printing, or otherwise recording, the data on the document should be relatively cheap. Such recording devices may well have a considerable tolerance in the positioning of the recorded data on the document.

It is the object of the invention to provide an improved arrangement for sensing recorded data, which is tolerant of limited displacement of the data relative to the sensing arrangement.

According to the invention apparatus for scanning a document with significant data representing areas defined by marks recorded on the document, comprising at least two sensing devices providing a line of adjacent scanning areas substantially perpendicular to the direction of scanning of the document, each sensing device being adapted to produce an output signal with an amplitude proportional to the degree to which the scanning area of that device is occupied by a mark, and a signal combining circuit adapted to be operated by said output signals to produce a data representing signal, the amplitude of which at any point in the scanning of the document is determined by the amplitude of the output signal of that sensing device which is producing the largest output signal.

The invention will now be described, by way of example, with reference to the accompanying drawing, in which.

Figures 1, 2:
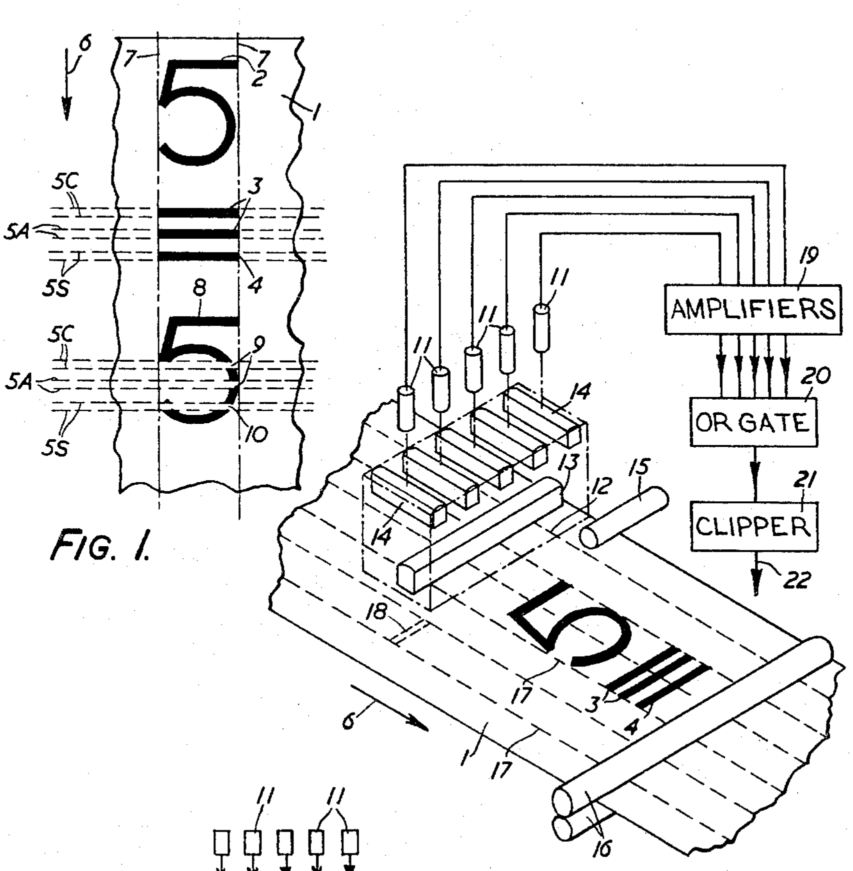
FIGURE 1 shows part of a document with data recorded thereon in two different representations.
FIGURE 2 shows a document sensing arrangement in schematic form.

FIGURE 1 shows part of a document 1 which has printed thereon a visually readable character 2, the digit "5," and associated marks 3 and 4, which represent the digit value five according to a particular code. This code is set out in British Patent 793,103, to which reference may be made for a detailed description of the coding and for a description of how the code marks may be sensed and given the appropriate code significance. Briefly, the mark 4 which lies between dotted lines 5S acts as a start mark to indicate that a group of code marks is about to be sensed, the document 1 being fed through a photoelectric sensing device in the direction indicated by arrow 6. Six code areas are provided between the start mark and the lower edge of the character 2. Those code areas which are significant in representing the particular character contain marks 3. For example, the digit five is represented by marks 3 in code areas A and C, these areas being indicated by dotted lines 5A and 5C, respectively.

The document 1 is fed through the sensing device at constant speed. In the arrangement described in the reference patent, the sensing device includes a photoelectric cell and a conventional optical system which produces a scanning area approximately equal to a code area, that is, equal to the area defined by one of the marks 3 or 4. When the white background formed by the surface of the document is passing across the scanning area, the photo-electric cell produces a constant output voltage modulated by random noise impulses. These noise impulses are partly due to inherent circuit noise and partly due to minor non-uniformities in the reflection coefficient of the document surface. When the mark 4 occupies the scanning area the amount of light reaching the photoelectric cell is greatly reduced, so producing a relatively large change in the amplitude of the output voltage of the cell. As the mark 4 moves out of the scanning area, the output voltage returns to the background value, so that a voltage pulse results from the scanning of the start mark. Similar voltage pulses result from the scanning of the two marks 3. The time of occurrence of the pulses produced by scanning of the marks 3 in relation to the pulse produced by the scanning of the start mark 4 indicates the code meaning of the pulses.

The scanning area can be completely occupied by a code mark provided that the alignment of the marks relative to the sensing device is such that the scanning area falls between the limits defined by chain-dotted lines 7. If the marks are mis-aligned, then part of the scanning area may fall outside the limits of the lines 7. Thus the scanning area will be only 75% or 50%, for example, occupied by a mark when that mark is being sensed. This produces a smaller change in the average light on the cell between sensing the background and a code mark. Consequently, the amplitude of the voltage pulse produced by sensing of a mark is reduced. The relation between the average light on the cell and the voltage output of the cell may not be linearly related, so that the reduction of amplitude of the voltage pulse may not be reduced in linear proportion to the reduction of the scanning area occupied by the mark. However, it is clear that the amplitude of the voltage pulse will steadily decrease as the proportion of the scanning area occupied by a mark is reduced. The voltage produced when the document surface is sensed is not altered, so that the reduction in amplitude of the voltage pulse causes a reduction in signal/noise ratio of the output from the cell in terms of the detection of signals corresponding to code marks.

It will be appreciated that the same arguments will apply if the background of the document is black and the marks 3 and 4 are white. The only difference will be that the polarity of the voltage pulses will be reversed. The only criterion for successful detection of the code areas is that there should be a sufficient difference in the light falling on the cell between the conditions when the scanning area is occupied by a mark and by the unmarked document surface. This difference may be increased for coloured printing by the use of suitable colour filters. For example, the contrast of red marks on a green background is increased by the use of a red filter or a green filter in the optical system. The red filter makes the marks apparently lighter than the background and the green filter makes the marks apparently darker than the background.

The marks 3 and 4 define the significant code areas by occupying three code areas. In the case of white marks on a black blackground, the part of the document on which data is to be recorded may be completely printed upon except for the significant code areas. Thus, the code areas are defined by the absence of printed marks in the significant areas. This latter form of recording may be combined with the recording of the visually readable character to form a modified coded recording as shown by character 8 in FIGURE 1.

In this modified form of recording, gaps 9 and 10 in the outline of the visually readable character correspond in significance to the marks 3 and 4, respectively, as indicated by the lines 5A, 5C and 5S. Other digits or characters are recorded in a similar manner, a gap in the printed outline of the character occuring where it intersects a significant code area. Thus a significant code area is defined by the absence of any printed mark within it. It is necessary, therefore, to scan the whole width between the lines 7 and to detect the difference between a code area containing no printed mark and one which does contain a printed mark, the proportion of the scanning area which is occupied by the printed mark varying according to the shape of the character being scanned. Consequently, the problem of obtaining a good signal/noise ratio in scanning the modified form of recording is similar to that in scanning the marks 3 and 4 when they are subject to misalignment relative to the sensing device.

It will be appreciated that characters illustrating the two forms of recording are shown on the same document only to facilitate the comparison of the two characters. In practice, any particular document would carry characters recorded in one form only.

It will be apparent from the examples considered above that there are practical difficulties in obtaining a high signal/noise ratio from a sensing device when the code areas do not fully occupy the scanning area, because of the particular form of recording and/or lack of accurate alignment of the code areas. The invention seeks to reduce such effects by providing two, or more, sensing devices and combining the signals from these sensing devices to produce a composite output signal which is determined at any particular time by that sensing device which is producing the largest output signal.

An arrangement employing five sensing devices for sensing the marks 3 and 4 is shown in schematic form in FIGURE 2. Each sensing device consists of a photoelectric cell 11 operating in conjunction with an optical system generally designated 12. The optical system 12 includes a lower cylindrical lens 13 which projects on to the plane of the active electrodes of the cells 11 an image of a section of the document 1 which is equal in width to the thickness of one of the marks 3 or 4. The light from the lens 13 passes through five cylindrical lenses 14. Each of the lenses 14 focuses part of the image formed by the lens 13 on to the associated cell. In this way, five separate adjacent scanning areas are formed.

The surface of the document viewed by the optical system is illuminated by a light source 15, as the document is fed through the sensing station by conventional feeding arrangements represented by feeding rollers 16. The cells 11 scan parallel strips of the document as indicated by dotted lines 17, as the document moves through the sensing station. The scanning area of the lowest cell 11 is indicated by dotted rectangle 18.

The width of each strip scanned by a cell is equal to half the length of the marks 3 and 4, in the arrangement illustrated. Consequently, when the mark 4, for example, is viewed by the optical system, the scanning area of two of the cells will be occupied by the mark. If the mark is displaced perpendicular to the direction of feeding by a distance equal to, say, one quarter of the length of the mark, then the scanning area of one cell 11 will be occupied by the mark and the scanning of two other cells will be half occupied by the mark. As long as at least half the mark is within the area bounded by the two outer lines 17, the scanning area of at least one cell will be fully occupied by the mark as it is sensed.

The signal from each of the cells 11 is separately amplified by a group of amplifiers and each amplified signal is fed to an input of a multi-input OR gate 20. The OR gate may be of any convenient form. For example, it may consist of a network of diodes connected in the manner described on page 219 of "The Design of Switching Circuits" by Keister, Ritchie and Washburn, published by D. Van Nostrand Co. Inc. (1951). The output lead from the OR gate is connected to the input of a voltage clipping circuit 21, the output signal from which appears on an output signal lead 22. Suitable clipping circuits are described in chapter 9 of volume 19 of the Radiation Laboratory Series published by McGraw-Hill Book Co. Inc. (1949).

For the purpose of explaining the operation of the sensing arrangement, it will be assumed that the amplified signal from each of the cells 11 is +30 volts and +5 volts when the scanning area is fully occupied by a mark and when the document background is being scanned, respectively. This gives a maximum signal/noise ratio of 6:1 for the detection of a mark. The output for all the cells will be at +5 volts as long as no mark is sensed. If the mark 4 is now sensed, the scanning area of at least one cell will be fully occupied by the mark, and the output from this cell will rise to +30 volts. The output lead of the OR circuit 20 assumes a voltage approximately equal to the highest positive input voltage. Consequently the input to the clipper circuit will rise from approximately +5 to +30 volts on the sensing of a mark even though the output from only one cell may have risen to this value. Thus, the signal/noise ratio at the output lead of the OR circuit is substantially equal to the maximum which the individual cells provide under the postulated conditions. This signal/noise ratio will be obtained as long as at least half the mark falls between the outer lines 17.

If a single cell were arranged to provide a scanning area equal to that of the five cells 11, only two-fifths of the scanning area of that cell could be occupied by the mark. The amplified output from the cell on sensing a mark would be +15 volts, assuming that the voltage varies approximately linearly with average illumination over the range of +5 to +30 volts. The single cell provides a maximum signal/noise of 3/1, as compared with a ratio of 6/1 for the group of cells 11.

The clipper circuit may be set to amplitude limit all signals below say, +7 volts to eliminate the random noise signals due to variations in the surface of the document. Thus the output signal on line 22 will consist of a pulse of approximately 23 volts amplitude each time a mark is sensed. The single cell arrangement would produce a pulse of 8 volts amplitude only under the same conditions.

Only two cells 11 are necessary if the degree of misalignment is not more than half the length of a mark either way from a central position. Alternatively, further cells 1 and associated lenses 14 may be provided, spaced apart in the same plane as those shown in FIGURE 2, to provide for even greater degrees of misalignment. A length for the scanning area of half a mark provides a convenient compromise between good signal/noise ratio and the number of cells required for any particular degree of misalignment, but other lengths of scanning area may be used. The characteristics of the optical system and the physical size of the cells 11 may be such that it is convenient to provide a small overlap or a small gap between the ends of adjacent scanning areas.

The sensing arrangement of FIGURE 2 may be used for sensing characters recorded in the modified form of the character 8 (FIGURE 1) by making minor alterations. Firstly, it is desirable that the optical system should be designed to provide a shorter scanning area and the cells 11 should be placed at a closer spacing. The mark forming the outline of the character between the two gaps 9 is of the order of one tenth of the overall width of the character 8, whereas the marks 3 are the full width of the character 2. The character 8 may be quite small, for example, it may be produced by a typewriter with the type slugs modified to print characters with the required code gaps in the outline. A practical comprise for sensing such a character is to utilise five cells which together scan the width of the character. This spacing will provide an output signal with a satisfactory signal/noise ratio, although a still closer spacing will further increase the signal/noise ratio.

At least one cell will be providing an output greater than +5 volts during the sensing of the character, except when the gaps 9 and 10 are sensed. Hence, it is desirable to provide a clipped output signal on the line 22 whenever the output from all the cells has fallen to +5 volts. This is the converse of the conditions for detecting the marks 3 and 4, so that the operation of the clipper circuit should be reverse to eliminate all voltage changes greater than, say, +15 volts. The gaps are then represented by negative-going pulses on the line 22, the voltage falling to +5 volts from the clipped base line of +15 volts. The voltage level at which clipping should occur is determined by the maximum voltage provided by any of the cells when the minimum area of mark lies within the scanning area. This occurs when a substantially vertical part of the character outline is being scanned.

Figure 3:
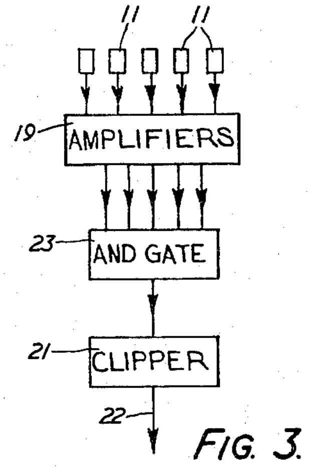
FIGURE 3 shows a modification of FIGURE 2.

The criterion for detecting the gaps 9 and 10 is that all the cells 11 should provide the same output voltage. This condition may be met by replacing the OR gate 20 by an AND gate 23, as shown in FIGURE 3. The AND gate may be of any suitable form. For example, it may consist of a network of diodes arranged as described on page 218 of the publication "The Design of Switching Circuits" already referred to.

The phasing of the amplifiers 15 is reversed to provide an amplified output of +30 volts when no mark is within the scanning area of a cell and +5 volts when the scanning area is fully occupied by a mark. The clipper 21 is set to eliminate all voltage variations below, say, +15 volts. Operating in the conventional manner, the output lead of the AND circuit 23 will assume a voltage approximating that of the least positive input, and the voltage will rise to approximately +30 volts only when the amplified outputs of all the cells rise to +30 volts. Thus, the output signal on the lead 22 will consist of a positive pulse each time a gap is sensed, the voltage variations, due to the varying amounts of the total scanning area which are occupied by the character outline, being removed by the clipper circuit.

On the assumption that the scanning area of each cell is approximately twice the width of the mark forming the character outline and that the character is properly position relative to the sensing device, there is never a cell with less than half the scanning area occupied by a mark during sensing of a character, except when a gap is sensed. If a single cell were used to cover the same scanning area as the five cells of the example described above, then the required output signal representing sensing of a gap would correspond to the difference between nine tenths and the whole of the scanning being occupied by the document background. Thus, even the arrangement using five cells provides a very substantial improvement in signal/noise ratio of the output signal, and a further improvement is obtainable by further reduction of the length of the scanning area.

The photo-electric cell is a proportional sensing device in the sense that the output signal from it is a continuous function of the ratio of the mark and document background areas which are being scanned. This is in contrast with a discontinuous sensing device such as an electrical contact brush sensing a perforation for which there are only two states, that is, the brush either does or does not complete a circuit.

The term "document" is used in the specification and claims as a convenient generic term for the basic carrier on which the data is recorded and includes the use of materials other than card or paper tape as the carrier. For example, the data may be recorded on a plate of synthetic plastic or metal, which is suitable for manual insertion into a data sensing arrangement. It will be appreciated that it may be more convenient to perform the scanning by moving the sensing devices and the optical system relative to the document being sensed.

I claim:

1. Apparatus for sensing significant character representing areas defined by marks recorded on a document, said apparatus comprising a group of sensing devices arranged to provide a line of adjacent scanning areas; each of which is smaller than one of said significant areas; document feeding means operative to feed the document past the sensing devices so that said line of scanning areas is traversed in sequence by the significant areas representing a character; an electronic gate circuit with an input for each of the sensing devices and a single signal output; and means to apply signals from each of the sensing devices to a corresponding input of the gate circuit, the gate circuit being responsive to the application of simultaneous input signals to produce at said single signal output a signal the amplitude of which is determined by that of the largest input signal, whereby the output signal amplitude is indicative of the presence of a significant area in any of said scanning areas.

2. Apparatus for sensing character representing code marks recorded selectively in a group of code positions on a document, said apparatus comprising a group of sensing devices arranged to provide a line of adjacent scanning areas, each scanning area being less in area than a code mark; means for feeding the document to pass the code positions sequentially through the line of scanning areas; an OR gate with a signal input for each sensing device and a single signal output; and means for deriving from each sensing device and applying to the corresponding input of the OR gate a signal with an amplitude proportional to the amount of the scanning area of that device which is occupied by a code mark, the OR gate being responsive to all the simultaneously applied input signals to provide an output signal with an amplitude which is determined by the amplitude of the largest of said input signals.

3. Data processing apparatus including a document bearing a visually readable character outline, with gaps at selected points to provide a coded representation of the character; a group of sensing devices arranged to provide a line of adjacent scanning areas; means for feeding the document to pass the character through the line of scanning areas; an AND gate with a signal input for each sensing device and a single signal output; and means for deriving from each sensing device and applying to the corresponding input of the AND gate a signal with an amplitude determined by the amount of the scanning area of that device which is occupied by the character outline, the AND gate being responsive to the signals from all the sensing devices to provide a single output signal indicative of the sensing of said gaps.

4. Apparatus according to claim 3, in which the output signal is fed to the input of a voltage clipping circuit which is responsive to said signal to produce an output voltage during scanning of the character of constant amplitude except when a gap is sensed.

5. Data processing apparatus including a document bearing a visually readable character outline, with gaps at selected points of the outline to provide a coded representation of the character; a group of photoelectric sensing cells spaced apart along a line; a first cylindrical lens with the major axis parallel to said line; a group of second cylindrical lenses, one for each cell and each with the major axis perpendicular to said line, the cells and lenses together providing a line of adjacent scanning areas; feeding means for the document operative to pass the character through the line of scanning areas to cause the voltage output of each sensing cell to vary in accordance with the passage of part of the character outline through the corresponding scanning area; and an AND gate responsive to the voltage output of all the sensing cells to deliver a predetermined output voltage during the sensing of a character only when all the cells are sensing a gap.

6. Apparatus according to claim 5, having a voltage clipping circuit responsive to said output voltage to deliver a significant output signal only when a gap is sensed by said cells.

References Cited in the file of this patent

UNITED STATES PATENTS

| | | |
|---|---|---|
| 2,615,992 | Flory et al. | Oct. 28, 1952 |
| 2,616,983 | Zworykin et al. | Nov. 4, 1952 |
| 2,932,006 | Glauberman | Apr. 5, 1960 |